US005608278A

United States Patent [19]
Mey et al.

[11] Patent Number: 5,608,278
[45] Date of Patent: Mar. 4, 1997

[54] SELF-PUMPED FLUID BEARING WITH ELECTROMAGNETIC LEVITATION SUCH AS FOR A LIGHT BEAM DEFLECTOR

[75] Inventors: William Mey, Rochester; Bijan Barzideh, Rush; Thomas M. Stephany, Churchville, all of N.Y.

[73] Assignee: Eastman Kodak Company, Rochester, N.Y.

[21] Appl. No.: 372,550

[22] Filed: Jan. 13, 1995

[51] Int. Cl.⁶ ................................................ H02K 5/16
[52] U.S. Cl. .................. 310/90; 310/90.5; 310/67 R; 310/268; 310/179; 417/420
[58] Field of Search .............. 310/90, 90.5, 67 R, 310/68 R, 268

[56] References Cited

U.S. PATENT DOCUMENTS

| | | | |
|---|---|---|---|
| 4,726,640 | 2/1988 | Iwama et al. | 350/6.8 |
| 4,810,914 | 3/1989 | Karidis et al. | 310/12 |
| 4,875,110 | 10/1989 | Kazama et al. | 360/64 |
| 5,032,751 | 7/1991 | Morita | 310/90.5 |
| 5,149,253 | 9/1992 | Miyamoto et al. | 417/353 |
| 5,223,758 | 6/1993 | Kataoka et al. | 310/90 |
| 5,407,331 | 4/1995 | Atsumi | 417/420 |
| 5,510,664 | 4/1996 | Suzuki et al. | 310/268 |

Primary Examiner—Thomas M. Dougherty
Assistant Examiner—Elvin G. Enad
Attorney, Agent, or Firm—Milton S. Sales

[57] ABSTRACT

A fluid bearing includes a rotor and a stator. A DC motor drives the rotator. The DC motor has (1) a multi-phase set of coils on one of the rotor and stator and (2) a multi-pole magnet on the other of the rotor and stator opposed to the coils, the number of magnet poles being an even number which is different from the number of phases and the coils and magnet poles being arranged such that, at a predetermined position of the rotor, at least one of the coils is opposed by only one magnet pole. Commutation selectively applies DC current to the at least one coil, and not to a coil opposed by more than one magnet pole, when the rotor assembly is at the predetermined position of a polarity to cause the at least one coil to repel the opposed magnet pole, creating a magnetic force urging the bearing surfaces apart.

14 Claims, 6 Drawing Sheets

SELF-PUMPED FLUID BEARING WITH ELECTROMAGNETIC LEVITATION SUCH AS FOR A LIGHT BEAM DEFLECTOR

CROSS REFERENCE TO RELATED APPLICATIONS

Reference is made to commonly assigned, co-pending U.S. patent application Ser. No. 08/160,121, filed in the names of T. Stephany et al. on Nov. 30, 1993.

BACKGROUND OF THE INVENTION

1. Technical Field

This invention relates generally to self-pumped fluid bearings such as those used in light beam deflectors in beam scanning apparatus.

2. Background Art

Laser sources combined with rotating beam deflection mechanisms are known for use in reading image information (also known as input scanning), exposing or printing image information (also known as output scanning), and displaying image information. For example, holographic beam deflectors rotate a holographic disk in the path of a stationary beam of light, such as from a laser source, and the rotation causes the beam to scan.

Self-acting hydrodynamic bearings are preferred in high-speed rotating polygon and hologon laser beam deflection systems. Such a bearing supports the load (e.g., a holographic disk) by the pressure generated by a fluid flow in the bearing gap. The fluid flow is determined by the relative motion of the bearing surfaces and viscosity of the fluid. These bearings may be categorized according to the composition of the hydrodynamic fluid (gas, oil, grease, etc.). Self-acting gas bearings have the advantage that the threat of contamination of the hologon by oil or grease is avoided. At speed, a self-acting gas bearing operates on a thin gas film that develops between the bearing surfaces. The benefit is that the stiffness of the self-acting gas bearing controls the location of hologon disk 26 along spin axis 46, which is preferable to (for example) a magnetic thrust bearing, which is much more susceptible to axial perturbations of the hologon that significantly degrade the scanning accuracy of the beam scanning system.

Self-acting fluid bearings require relative movement of the bearing surfaces to generate a fluid pressure in the bearing gap. The bearing surfaces are in contact when the load is at rest and at start-up and shut-down.

Accordingly, there exists a need for a self-acting fluid bearing to support a beam deflector preferably in the form of a holographically-generated planar diffraction grating disk (i.e., a hologon) that effects smooth and precise rotation of a load over an extended series of start/stop cycles. The fluid bearing should preferably operate either vertically or tilted at an angle.

One major factor of catastrophic failures of fluid bearings appears to be the contact of the rotor assembly on the spindle and lower thrust plate during the transition from the rest state to the operating state (termed herein "lift-off"). A second factor is the tilt of the spin axis, which accentuates the load on the self-acting bearing and aggravates the impingement of the bearing surfaces during lift-off rotations of the rotor assembly.

Commonly assigned, co-pending U.S. patent application Ser. No. 08/160,121, filed in the names of T. Stephany et al. on Nov. 30, 1993, discloses a self-acting gas bearing in which the weight of the rotor assembly, which includes the hologon and other components, is reduced (i.e., unweighted) by use of opposing magnets. The frictional degradation of the lower thrust plate at start-up and touch-down is therefore reduced. Although the gas bearing described in the Stephany et al. application has been found useful in a high precision output writer application where the requirement for high speed motor operation (above 12,000 rpm) and extremely low flutter, there exists a desire for self-pumped fluid bearings that do not require the addition of unweighting magnets.

SUMMARY OF THE INVENTION

According to a feature of the present invention, a significant improvement in reliability and performance is obtained by reducing the duration and severity of contact during lift-off transitions. The undesirable effects of liftoff are greatly reduced or eliminated by virtue of an electromagnetic levitation unloading of the rotor assembly.

Electromagnetic levitation positively acts to "unload" or relieve a predetermined proportion of the thrust load of the rotor assembly. In accordance with a key feature of the present invention, therefore, the rotor assembly is at least partially unweighted upon actuation of the motor assembly such that the upper and lower thrust plates lift-off very quickly and thereby experience a decreased amount of frictional wear. Also, the onset of lift-off occurs at a much lower speed than that occurring in a conventional self-acting fluid bearing.

A first benefit of the bearing design according to the present invention is that the required starting torque is minimized. Furthermore, the hologon system of the preferred embodiment of the present invention benefits from locating the hologon disk spin axis at an angle to horizontal. This canted relationship reduces the profile of the hologon system such that it is more compact than a conventional gas bearing design.

According to a preferred embodiment of the present invention, a fluid bearing includes a rotor and a stator. A DC motor drives the rotator. The DC motor has (1) a multi-phase set of coils on one of the rotor and stator and (2) a multi-pole magnet on the other of the rotor and stator opposed to the coils, the number of magnet poles being an even number which is different from the number of phases and the coils and magnet poles being arranged such that, at a predetermined position of the rotor, at least one of the coils is opposed by only one magnet pole. Commutation selectively applies DC current to the at least one coil, and not to a coil opposed by more than one magnet pole, when the rotor assembly is at the predetermined position of a polarity to cause the at least one coil to repel the opposed magnet pole, creating a magnetic force urging the bearing surfaces apart.

The present invention will become more apparent when understood in conjunction with the following description and drawings, wherein like characters indicate like parts and wherein the drawings form a part of the present description.

BRIEF DESCRIPTION OF THE DRAWINGS

An embodiment of the present invention will now be described, by way of example, with reference to the accompanying drawings in which.

DETAILED DESCRIPTION OF THE PREFERRED EMBODIMENTS

Figure 1:
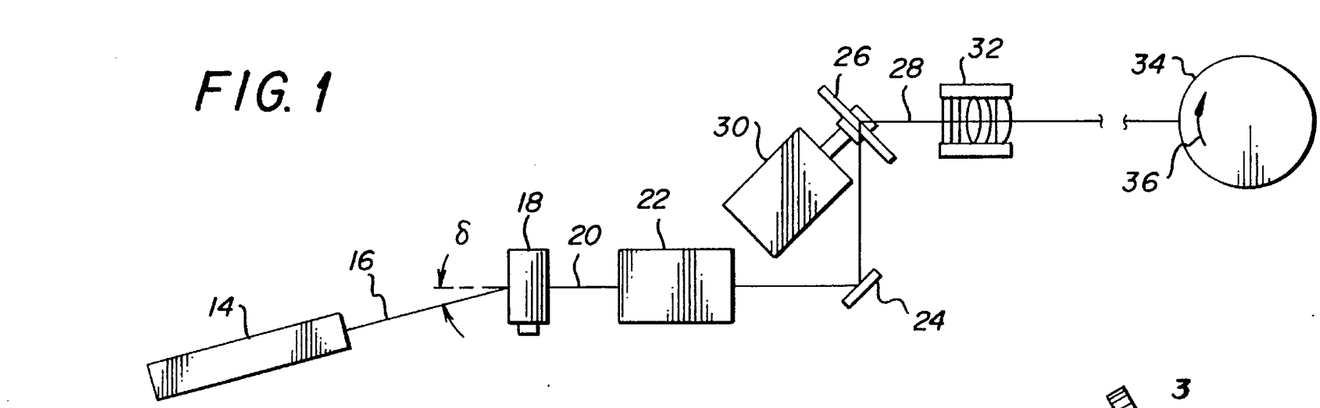
FIG. 1 illustrates a single beam holographic scanner constructed in accordance with the present invention.

As shown in FIG. 1, a beam scanning system may be constructed to include a modulated light beam source 14 such as a laser for generating a source beam 16 that enters an acousto-optical modulator 18. Input beam 20 enters beam shaping optics 22 and a mirror 24 to form beam 20 to the proper size and to direct it to a rotating hologon 26, whereupon the input beam becomes a scanning output beam 28.

The contemplated output beam 28 will scan in a nominally horizontal direction as hologon 26 is rotationally driven by a high speed motor 30. Output beam 28 then passes through beam focusing optics, such as a reflective optical element or an f-Q lens 32 to form a single beam spot on a target represented by rotating drum 34. The image plane is therefore located at the drum surface where the scan is parallel to the axis of drum rotation.

Output 28 is deflected in a horizontal scanning (x-axis) direction on the image surface of drum 34, along a line normal to the plane of the drawing in FIG. 1, while the vertical or cross scan component of the beam in the z-axis direction is achieved by rotation of drum 34 in the direction of arrow 36 to thus generate a two-dimensional raster scan.

Preferably, the hologon scanner is an output device such as a printer, and therefore the target would include a photosensitive medium on the drum surface. Alternatively, the contemplated hologon scanner can be modified, according to techniques known to a skilled practitioner, to be operable as an input device, such as an optical reader.

Further details concerning the aforementioned acousto-optical modulator 18 and suitable component beam modulation techniques may be found in commonly-assigned U.S. Pat. No. Re. 29,670 reissued in the name of Spaulding and commonly-assigned U.S. Pat. No. Re. 31,334, reissued in the names of Spaulding and Pickering, the disclosures of which are included herein by reference.

Figure 2:
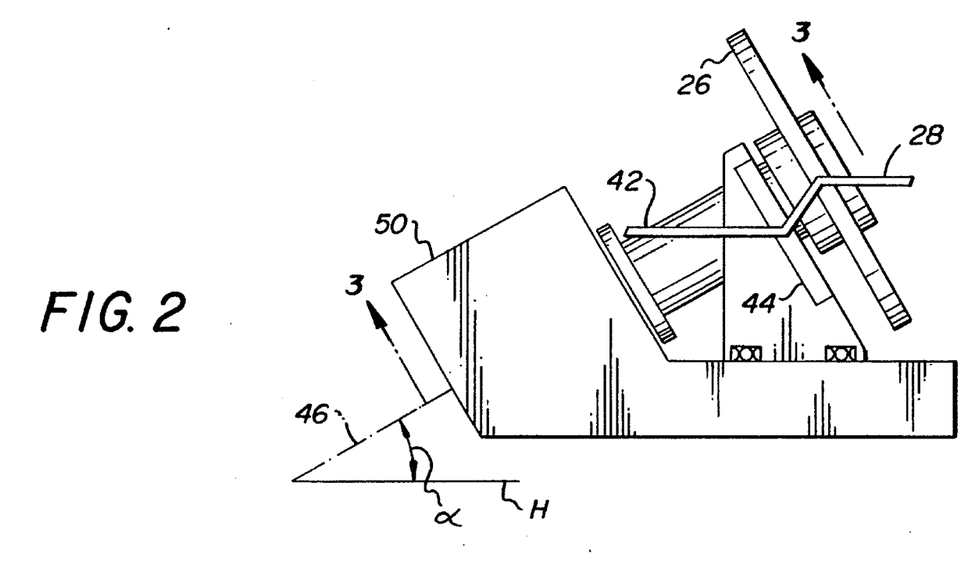
FIG. 2 is a side perspective view of a preferred embodiment of the rotating beam deflector of FIG. 1.
Figure 3:
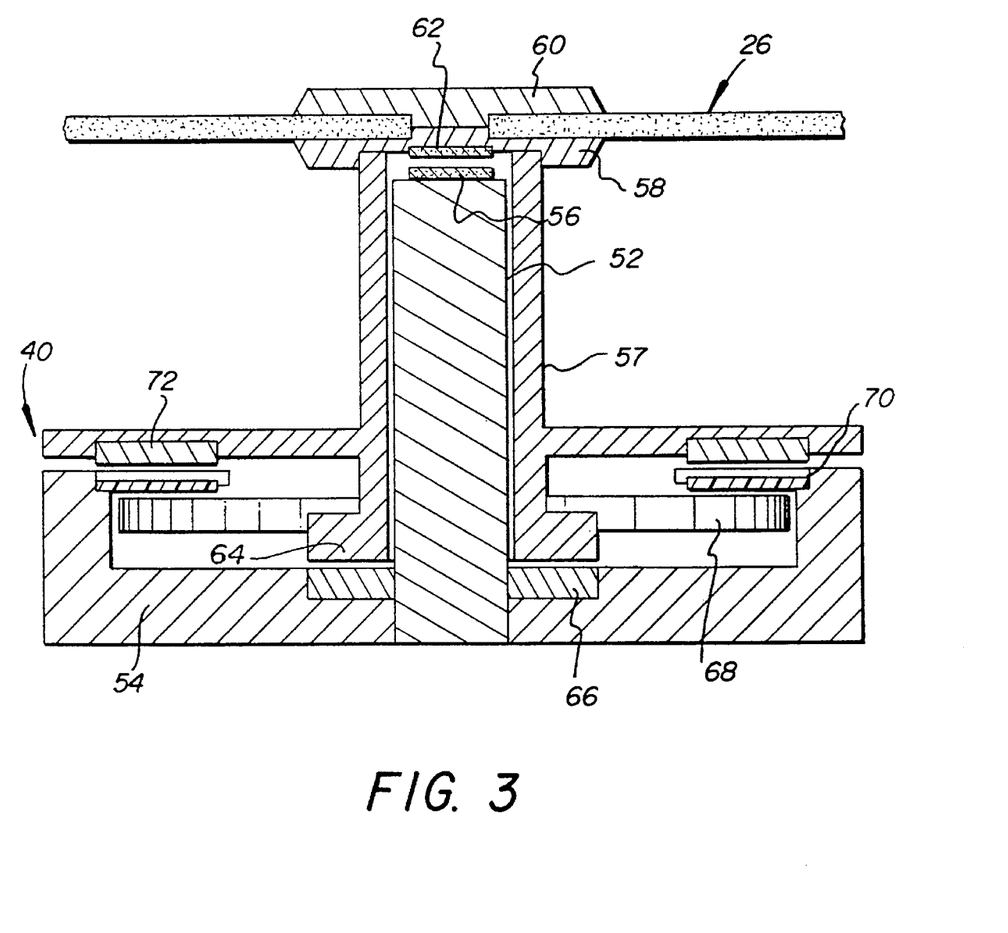
FIG. 3 is a cross-sectional view taken on the line 3—3 in FIG. 2.

As illustrated in FIGS. 2 and 3, the hologon system includes a self-acting gas bearing 40 constructed according to the present invention for use in the laser scanning system of FIG. 1. As shown in FIG. 2, a stationary input light beam 42 from the light source is directed along a horizontal path through a stationary grating 44, whereupon the input beam is directed upwards to the spinning hologon disk 26. By virtue of known diffraction phenomena, rotation of the hologon disk imparts a scanning motion to the redirected light beam so as to form scanning output beam 28 having a scan direction within a horizontal scanning plane slightly displaced from the plane of stationary input light beam 42.

Due to the tilt of the spin axis and the arrangement of input light beam 42 and scanning output beam 28, both the input beam and the output beam may be located within the compact profile of the system. The tilt of the spin axis thus allows the profile of the system to be minimized. The beam scanning apparatus may be constructed with a more compact profile without resort to costly and complex beam-steering optics used in the prior art.

Referring to FIGS. 2 and 3, the hologon system includes a housing, a motor assembly, a self acting gas bearing, and hologon disk 26 that is mountable for rotation about axis 46. The housing supports a stator assembly including a fixed cylindrical bearing spindle 52. A corresponding rotor assembly includes a cylindrical bearing sleeve 57 which has mountable thereon a disk support ring 58 and a disk retention cap 60 for mechanically or adhesively fixing hologon disk 26 to support ring 58 (thereby fixing the disk to bearing sleeve 57). In some applications, hologon disk 26 may include a central aperture, for cooperation with the mounting cap and the supporting ring. The integral combination of the disk, the cap, the support ring, and the bearing sleeve form the rotor assembly. The bearing sleeve is rotatable about the cylindrical spindle in a manner co-axially with spin axis 46.

The housing encloses the lower portion of the gas bearing assembly. That is, the base of spindle 52, bearing sleeve 57, upper and lower grooved thrust plates 64 and 66, respectively, and a combined lower balancing plane and rotating flux plate 68. The motor assembly includes a circuit board 70, attached to the housing and including motor driving coils, and motor magnets 72 attached to an upper rotating flux plate that is integral with the bearing sleeve. The rotor assembly may be rotated by the motor assembly and motor controlling and driving means (not shown for clarity) as known in the art.

In the preferred embodiment, bearing spindle 52 and bearing sleeve 57 have respective opposing bearing surfaces formed from 440-C stainless steel or its equivalent and may be formed as plain (grooveless) or grooved surfaces. The choice of a grooveless design constructed from steel makes for an inexpensive gas bearing that is simpler to fabricate than most prior art designs. The interfaces of the upper and lower thrust plates 64, 66 are preferably grooved in a helical or other selected pattern to achieve the requisite fluid flow when spun as known in the art. Rotation of the rotor assembly thus causes a thin gas film to be built up in the thrust plate gap. The upper thrust plate bearing surface is lifted from the lower thrust plate bearing surface, whereupon the rotor assembly achieves a steady state, full speed rotation and no longer contacts spindle 52 or any other point in the hologon system.

Hologon 26 has multiple facets bounded by radial lines. Each facet includes a diffraction grating pattern. The hologon disk may be transparent or opaque, depending on whether the holographic beam deflector is of the transmission or reflection type. The disk may be regarded as divided into a plurality of sector-shaped facets; that is, regions bounded by two radial lines extending radially from the axis of the disk and an arc concentric with the disk, the arc usually being a portion of the circular periphery of the disk. Further information on hologons may be found in *Optical Information Processing and Holography*, by W. Thomas Cathey, JOHN WILEY & SONS; and *Handbook of Optical Holography*, by H. J. Caulfield, ACADEMIC PRESS, INC.

Other aspects of the hologon system and the design of the self-acting gas bearing may be determined according to the particular application and as known in the art. Accordingly, further description of the preferred embodiment will be directed to a novel technique for unloading the rotor assembly mass that serves to significantly extend the start/stop life of the hologon system.

Figure 4:
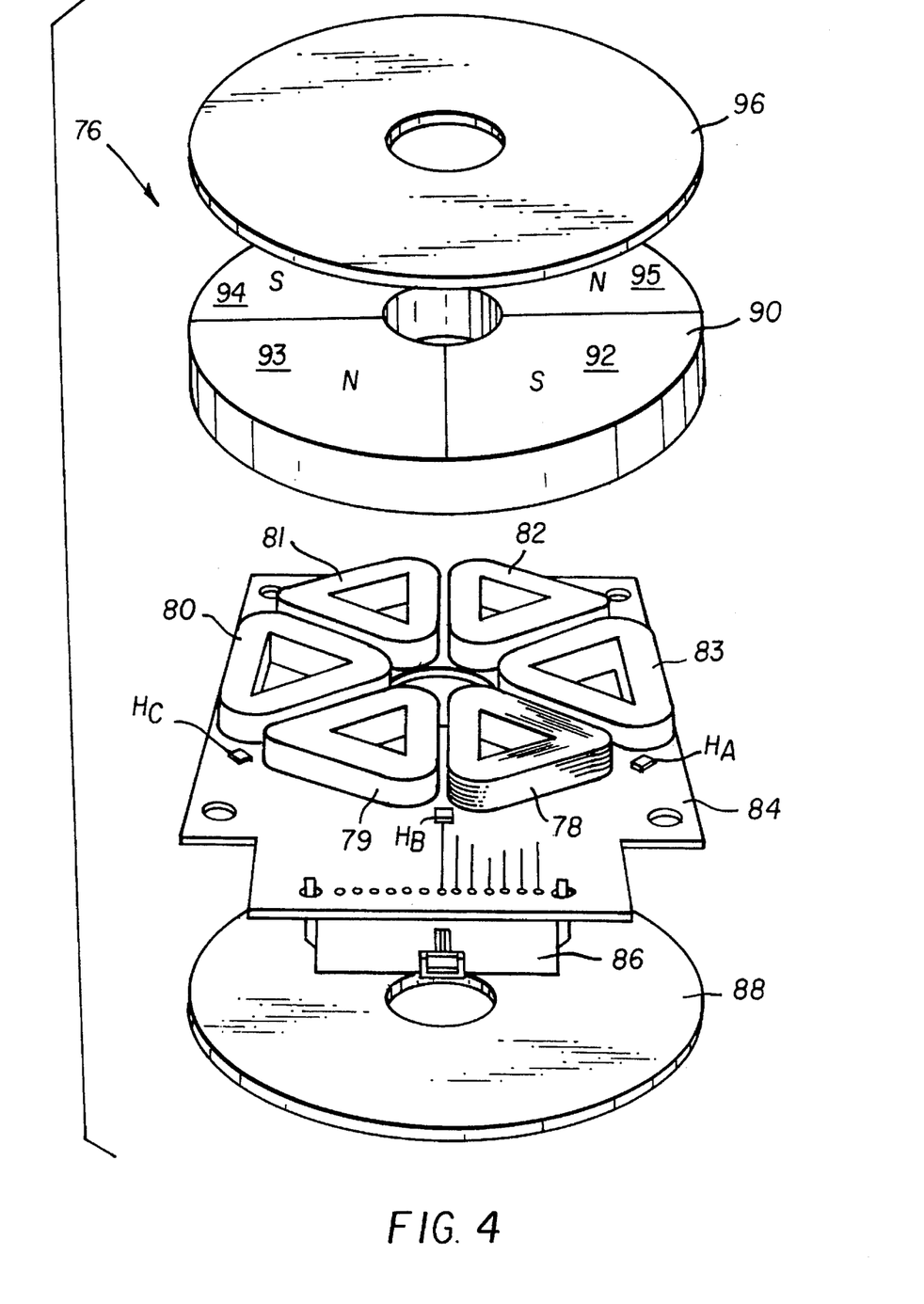
FIG. 4 is an exploded view of a brushless DC motor for the single beam holographic scanner shown in FIG. 1.

Referring to FIG. 4, a three phase, brushless DC motor 76 consists of six coils 78–83. Typically, each phase of such motors will consist of two or more coils. The motor is mounted on a printed circuit board 84 that has an electrical connector 86 and is attached to a metal lower (in the illustrated orientation) flux plate 88. A rotor 90 consists of a permanent magnet with four or more poles 92–95. The rotor is attached to an upper (in the illustrated orientation) flux plate 96. There are three Hall sensors $H_A$, $H_B$, and $H_C$ mounted on the circuit board near each phase coil 78–83. The Hall sensors are sixty mechanical degrees apart, and provide rotor magnet positional information for electronic commutations, as explained below.

Figure 5:
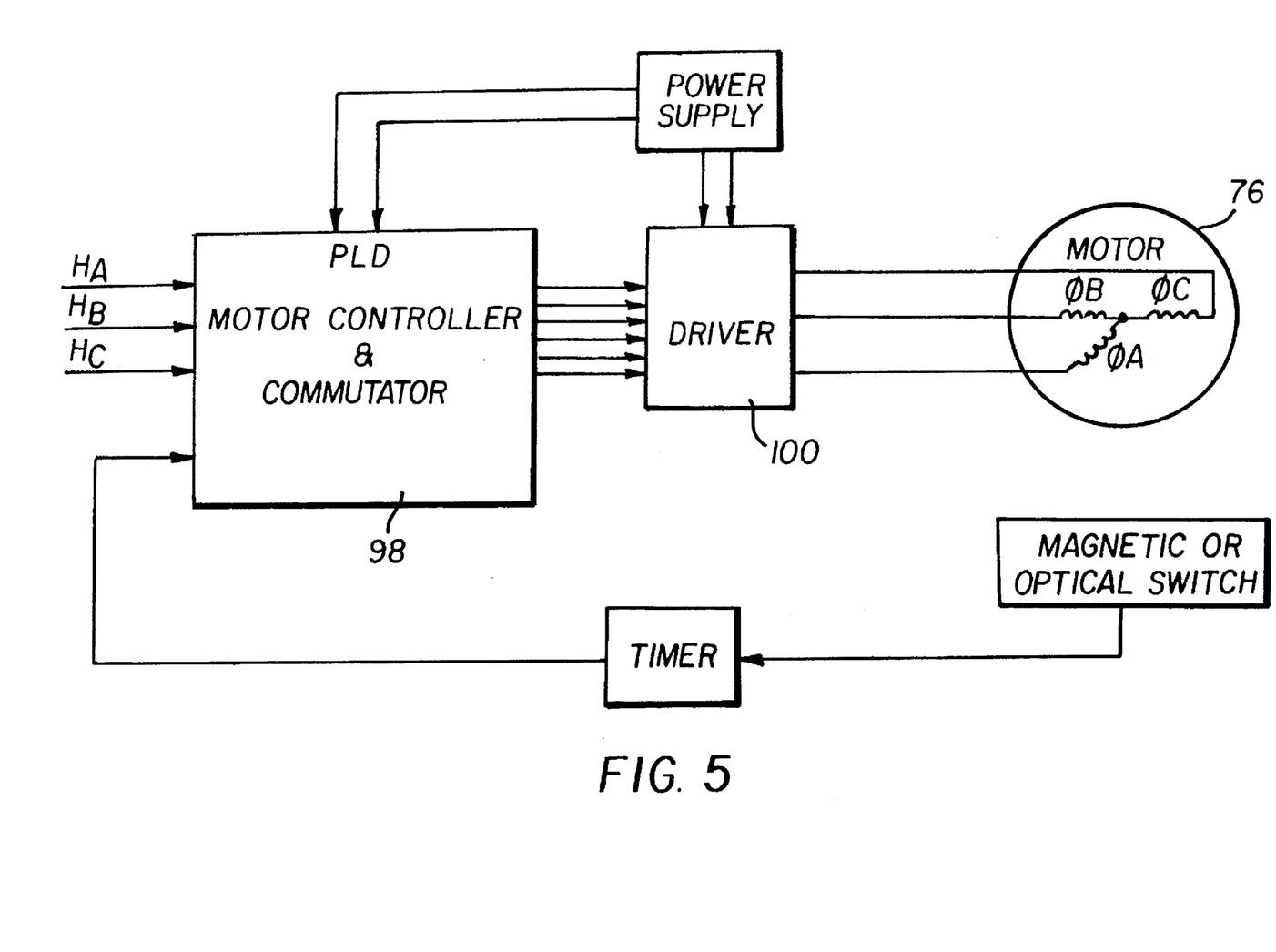
FIG. 5 is a schematic block diagram of an electrical control for the single beam holographic scanner shown in FIG. 1.

Referring to FIG. 5, signals from Hall sensors $H_A$, $H_B$, and $H_C$ are decoded such as by a programable logic device 98 to create a signal which passes through six logical states during electrical cycle. Each of the six logical states produces a unique combination of phase current and polarity through a driver 100. The driver, consisting primarily of six power transistors, switches the electrical current to DC motor 76 among the three phases such that at any given position of rotor 90, two of the three phases provide a current path and produce torque in a desired direction.

Figure 6:
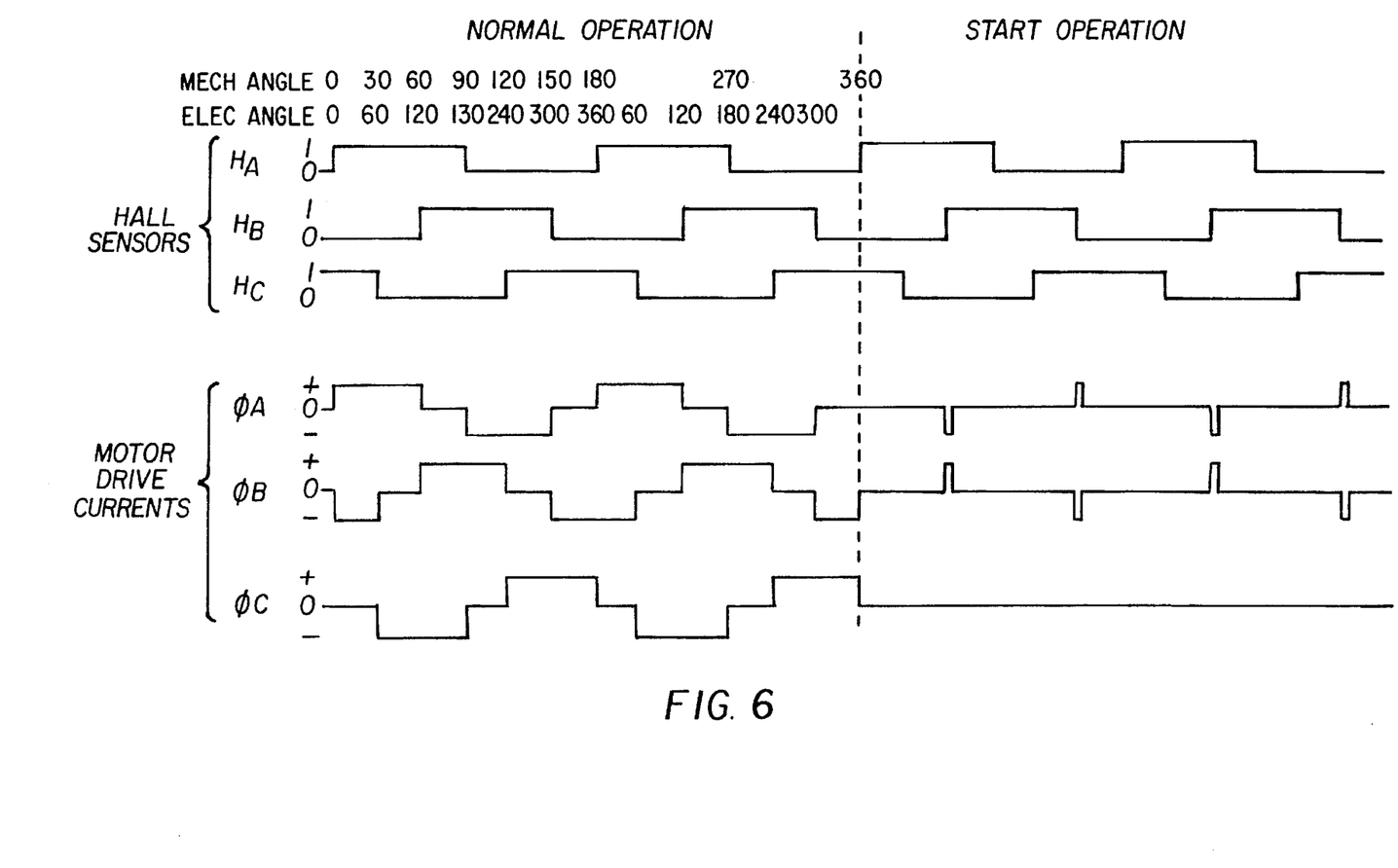
FIG. 6 is a chart showing Hall sensor states and motor drive currents for clockwise rotation of the scanner.

In normal operation of a brushless DC motor using six coils and a four-pole permanent magnet, a Hall sensor generates a series of voltage pulses as it responds to the rotation of the magnet. For example, a Hall sensor will display a LOW voltage state when a South magnetic pole is above the sensor and a HIGH voltage state when a North magnetic pole is above the sensor. The sensor voltage will change states whenever a magnetic pole change occurs. This is illustrated in FIG. 6 for rotation in a clockwise direction as viewed in the drawings, and in FIG. 7 for rotation in a counter clockwise direction. As Hall sensor $H_A$ goes from a LOW voltage state to a HIGH voltage state, which means a South to North magnet transition has occurred, programmable logic device 98 commands driver 100 to apply a positive current to phase A coils 78 and 81 (FIG. 4), a negative (opposite direction) current to phase B coils 79 and 82, and no current to phase C coils 80 and 83. The current in phase A and B coils produce a rotation-causing torque due to the force (called a Lorentz force) between the current in the coils and the magnetic field from magnet in rotor 90.

Figure 7:
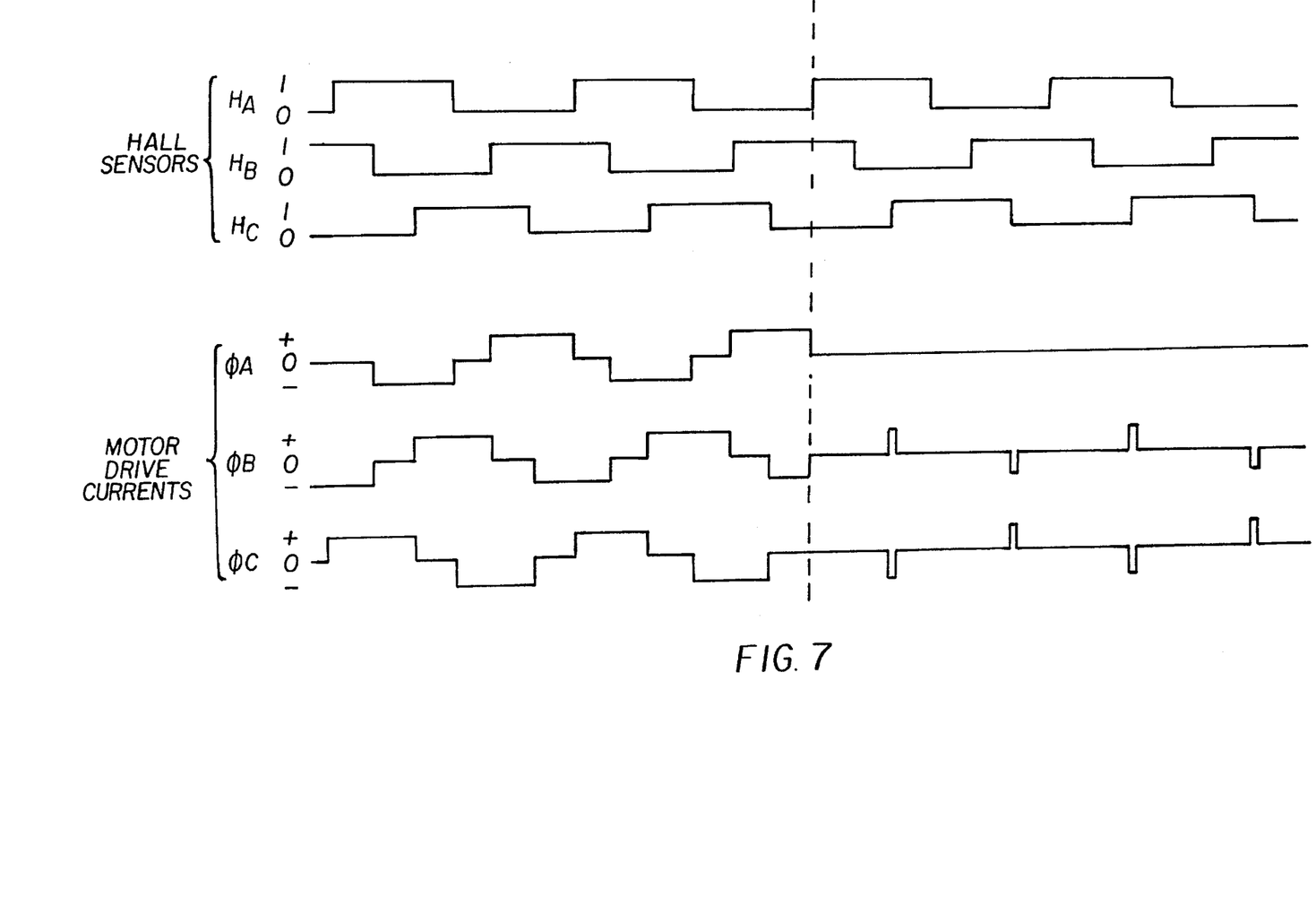
FIG. 7 is a chart showing Hall sensor states and motor drive currents for counter clockwise rotation of the scanner.

As the rotor turns about thirty mechanical degrees, a state transition occurs at Hall sensor $H_C$ due to the arrival of a south pole at the location of $H_C$ causing $H_C$ to go from a HIGH voltage state to a LOW voltage state. Programmable logic device 98 commands driver 100 to turn off electrical current to phase B coils 79 and 82, and to apply a negative (in direction) current to phase C coils 80 and 83. As this process is repeated over and over, the magnet experiences a constant rotational velocity.

The Lorentz force mentioned above is a force in the plane of the magnet and causes the magnet to rotate. Under certain electrical conditions and magnet positions, it is possible for the Lorentz forces to cancel and to obtain an axial force resulting in magnetic lift (or magnetic pull) with no rotation. This magnetic lift is due to the magnetic field created by current flowing in the coil. When current flows through a coil, an axial magnetic field is created, and the direction of the North pole depends upon the direction of current flow. If the pole of the permanent magnet located above the coil is the same as the one created by the current flow in the coil, magnetic lift will occur. Of course, if the poles are opposite, magnetic attraction will occur. In the example motor shown in FIG. 4, there are twelve unique positions when the Lorentz forces due to the various coils will cancel (i.e., no rotation), and will produce only a lifting force on rotor 90. In general, the number of positions where only lift will occur is three times the number of magnetic poles.

Magnetic lift can be accomplished by programming the programmable logic device to command driver 100 to apply current to the coils of the appropriate phases at the appropriate time and in the appropriate direction as illustrated in FIG. 5. However, to obtain magnetic lift, the magnet must be located at one of the unique positions as stated above. Generally, this means that the motor starts from a magnetic lift location. There are a number of methods for stopping the motor at a particular spot, all of which can be controlled by programmable logic device 98. One of the methods is a solenoid which indexes the magnet as it slows to a stop. As the motor slows to a stop, the Hall sensor is used to determine when to activate the solenoid. The solenoid shaft then engages the magnet, preventing any further movement. In order to slow the motor to a complete stop, known techniques such as shorting the motor coils (called dynamic breaking) could be used in conjunction with the solenoid. Another method for stopping the motor at a particular spot is to use the Hall sensor or a "once-around" signal output and apply dynamic breaking to quickly stop the motor when the magnet arrives at the desired spot. Still another method for stopping the motor at a particular spot is to use an encoder so that the exact location of the magnet (or motor shaft) is known at all times. The magnet is stopped at any desired location simply by monitoring the encoder output signal and applying a braking signal to the motor driver. As used herein, these and other methods and apparatus for insuring that the rotor stops the magnet at one of the unique magnetic lift locations is referred to as "detenting" the rotor.

As discussed above, significant improvement in reliability and performance can be obtained in self-pumped air bearings by reducing the duration and severity of contact between spindle 57 and thrust plate 66. In the novel apparatus and method disclosed herein, the spindle and thrust plate are separated prior to rotation by magnetic lift forces generated by motor coils 78–83. Once separation has occurred, programmable logic device 98 sends a signal to driver 100 to spin the motor at a high rotational velocity, whereupon the spindle/thrust plate separation is maintained by the thin gas film that develops between the bearing surfaces.

When stopping the motor, contact will eventually occur between the two surfaces as the motor slows down. This contact can be postponed by using the same technique as used to separate the two surfaces prior to spinning the motor. As the dynamic breaking pulse is applied to the driver, a commutation method is used to alternate between slowing the motor and providing magnetic lift from the motor coils. The method is similar to the one described above for magnetic lift prior to rotating the motor. In this manner, frictional forces leading to degradation or failure of motor performance is reduced for both start-up and stopping the motor.

In summary, for brushless DC motors described above, there are two forces at work. The Lorentz force, responsible for spindle rotation, and magnetic lift forces which normally are deleterious and ignored because they are unimportant for motor rotation. We have discovered, however, that the magnetic lift forces can be used to a practical advantage in supplying lift to improve the reliability and performance by minimizing the contact between the spindle and thrust plate in motors using self-pumped air bearings.

The invention has been described in detail with particular reference to preferred embodiments thereof, but it will be understood that variations and modifications can be effected within the spirit and scope of the invention.

What is claimed is:

1. A fluid bearing comprising:

a rotor assembly having a rotor assembly bearing surface;

a stator assembly positioned co-axially with the rotor assembly and having a stator assembly bearing surface opposed to the rotor assembly bearing surface;

a DC motor for rotatably driving the rotor assembly relative to the stator assembly, the DC motor having (1) a multi-phase set of coils on one of said rotor and stator assemblies and (2) a multi-pole magnet on the other of said rotor and stator assemblies opposed to the coils, the number of magnet poles being an even number which is different from the number of phases and said coils and magnet poles being arranged such that, at a predetermined position of the rotor assembly, at least one of the coils is opposed by only one magnet pole; and commutation means for selectively applying DC current to the at least one coil, and not to a coil opposed by more than one magnet pole, when the rotor assembly is at said predetermined position of a polarity to cause the at least one coil to repel the opposed magnet pole, creating a magnetic force urging the bearing surfaces apart.

2. A fluid bearing as set forth in claim 1 wherein the DC motor is brushless and the set of coils is on the stator.

3. A fluid bearing as set forth in claim 1 wherein the fluid is a gas.

4. A fluid bearing as set forth in claim 1, wherein each phase of the DC motor comprises at least two coils.

5. A fluid bearing as set forth in claim 1, further comprising means for stopping rotation of the rotor only at said predetermined position.

6. A fluid bearing as set forth in claim 1, further comprising means for producing a dynamic fluid pressure between said bearing surfaces during rotation of the rotor assembly, whereby the bearing surfaces are forced apart.

7. A fluid bearing as set forth in claim 1, wherein the means for applying DC current to the one and other coils is selectable only during start-up when the rotor assembly is at rest.

8. A fluid bearing comprising:

a rotor assembly having a rotor assembly bearing surface;

a stator assembly positioned co-axially with the rotor assembly and having a stator assembly bearing surface opposed to the rotor assembly bearing surface;

a DC motor for rotatably driving the rotor assembly relative to the stator assembly, the DC motor having (1) a three phase set of coils on one of said rotor and stator assemblies and (2) a four pole magnet on the other of said rotor and stator assemblies opposed to the coils, said coils and magnet poles being arranged such that, at a predetermined position of the rotor assembly, one of the coils is opposed by only one magnet pole and another of the coils is opposed by only one magnet pole; and commutation means for selectively applying DC current to the one and other coils when the rotor assembly is at said predetermined position of a polarity to cause the one and other coils to repel the opposed magnet poles respectively, creating a Lorentz force urging the bearing surfaces apart.

9. A fluid bearing as set forth in claim 8 wherein the DC motor is brushless and the set of coils is on the stator.

10. A fluid bearing as set forth in claim 8 wherein the fluid is a gas.

11. A fluid bearing as set forth in claim 8, wherein each phase of the DC motor comprises at least two coils.

12. A fluid bearing as set forth in claim 8, further comprising means for stopping rotation of the rotor only at said predetermined position.

13. A fluid bearing as set forth in claim 8, further comprising means for producing a dynamic fluid pressure between said bearing surfaces during rotation of the rotor assembly, whereby the bearing surfaces are forced apart.

14. A gas bearing as set forth in claim 8, wherein the means for applying DC current to the one and other coils is selectable only during start-up when the rotor assembly is at rest.

* * * * *